United States Patent [19]

Ohst et al.

[11] Patent Number: 5,439,964
[45] Date of Patent: Aug. 8, 1995

[54] THERMOPLASTIC MOLDING COMPOUNDS FOR THE PRODUCTION OF INORGANIC SINTERED MOLDINGS AND A PROCESS FOR THE PRODUCTION OF INORGANIC SINTERED MOLDINGS

[75] Inventors: Holger Ohst, Odenthal-Steinhaus; Lothar Schönfelder, Coburg; Stefan Roth, Itzgrund-Gleussen, all of Germany

[73] Assignee: Bayer Aktiengesellschaft, Leverkusen, Germany

[21] Appl. No.: 103,512

[22] Filed: Aug. 9, 1993

[30] Foreign Application Priority Data

Aug. 19, 1992 [DE] Germany .................. 42 27 419.2

[51] Int. Cl.⁶ .............................................. C08L 67/02
[52] U.S. Cl. ................................... 524/297; 524/296; 524/311; 524/312; 524/314; 524/442; 524/443; 525/437
[58] Field of Search ............... 525/437; 524/442, 443, 524/296, 297, 311, 312, 314

[56] References Cited

U.S. PATENT DOCUMENTS 3,023,192  2/1962  Shivers .
3,766,146  10/1973  Witsiepe .
4,169,867  10/1979  Burg et al. .
4,671,912  6/1987  Komatsu et al. .
5,214,088  5/1993  Allen .................................. 524/443

FOREIGN PATENT DOCUMENTS 329475   8/1989  European Pat. Off. .
413231   8/1990  European Pat. Off. .
531819   3/1993  European Pat. Off. .
101102  11/1987  Japan .

OTHER PUBLICATIONS

Adams et al., Thermoplastic Elastomers, Chapter 8, pp. 164–196.
Edirisinghe et al, Int. J. High Technology Ceramics 2(1986) 249–278.
Edirisinghe et al., Int. J. High Technology Ceramics 2(1986) 1–31.
Derwent Database, JP 61 077 672, Apr. 21, 1986.

Primary Examiner—Patricia A. Short
Attorney, Agent, or Firm—Connolly & Hutz

[57] ABSTRACT

A molding compound is disclosed which is useful in producing inorganic sintered moldings, which contains, in addition to an inorganic powder, a binder system containing a thermoplastically processable, partially crystalline polyester and an additional low molecular weight compound which may react with the polyester. A process is disclosed for preparing a sintered molding by injection molding of the molding compound, removal of the binder system, and sintering.

1 Claim, No Drawings

THERMOPLASTIC MOLDING COMPOUNDS FOR THE PRODUCTION OF INORGANIC SINTERED MOLDINGS AND A PROCESS FOR THE PRODUCTION OF INORGANIC SINTERED MOLDINGS

This invention relates to molding compounds for the production of inorganic sintered moldings suitable for injection molding or extrusion and to a process for the production of inorganic sintered moldings.

It is known that moldings can be produced from inorganic materials by mixing a ceramic powder or a metal powder with a thermoplastic resin, forming the resulting mixture into a green compact, removing the thermoplastic resin and then sintering the green compact freed from the resin to form the molding. The thermoplastic resin or binder used is selected, for example, from polystyrene, polypropylene, polyethylene, polyethylene-co-vinyl acetate or polymethyl methacrylate, generally in combination with auxiliaries such as, for example, stearic acid or dioctyl phthalate to improve the slip properties of the ceramic paste. A detailed review of the prior art can be found in synoptic articles by M. J. Edirisinghe and J. R. G. Evans, Int. J. High Technology Ceramics 2, 1–31 and 249–278 (1986) and by W. Michaeli, R. Bielzer in Ingenieur-Werkstoffe 2, 48–52 (1990).

These binders are removed from the green compact by heating to temperatures of 300° to 550° C. The binders are thermally decomposed in the process. The green compact has to be heated slowly and very carefully to those temperatures to ensure that it is not damaged by uncontrolled decomposition of the organic substances and hence by crack formation. For this reason, the heating rate should only be 4 K./hour. U.S. Pat. No. 4,671,912 recommends even lower heating temperatures of 1 to 2 K./hour, at least until half the binder has been removed. These long heating times of several days seriously reduce the economy of the processes several days seriously reduce the economy of the processes in question.

One way of accelerating removal of the binder, which is described in DE-A 39 26 869, is to degrade polyoxymethylene by acid catalysis in a gas stream. The disadvantage of this lies in the corrosive acid atmosphere at temperatures of up to 150° C., which necessitates particular equipment-related measures, and the emission of large quantities of formaldehyde as degradation product.

Another way is to introduce into the binder substances which are capable of sublimation and which first evaporate during the subsequent heating process and then act as so-called pore formers. Thus, JP-A 101 103 describes a mixture of polypropylene, poly(ethylene-co-vinyl acetate), paraffin and anthracene as the sublimable component. JP-A 101 102 describes a similar binder system in which terephthalic acid dimethyl ester is used as the sublimable component. However, one disadvantage of these systems lies in the fact that the shape determined by injection molding only remains intact if the softening temperature of the binder is not exceeded. For polypropylene, however, this temperature is too low for large quantities of the sublimable component to be able to escape in a reasonable time.

Accordingly, relatively high heating temperatures are required to accelerate the escape of pore formers. In order in this case, too, to guarantee the advantages of the green compact, it is proposed in EP-A 0 329 475 to use plasticizing compositions of which one component at least has a heat resistance of 130° C. or higher. However, this high heat resistance counteracts rapid removal of the binder on account of the impaired diffusivity of the pore former.

Accordingly, the problem addressed by the present invention was to provide molding compounds and processes for the production of inorganic sintered moldings by injection-moulding a mixture of a sinterable inorganic powder and a thermoplastic binder to a green compact, removing the binder and sintering which would not have any of the disadvantages mentioned above.

It has now been found that this problem can surprisingly be solved by molding compounds which contain binders consisting predominantly of thermoplastically processable elastomeric polyesters and other low molecular weight organic compounds.

Accordingly, the present invention relates to ceramic molding compounds suitable for injection molding or extrusion which contain a) an inorganic powder and
b) a binder system consisting of at least 20 to 80% by weight of a thermoplastically processable partly crystalline elastomeric polyester having a melting temperature of >130° C. and preferably in the range from 180° to 230° C.,
c) in the binder system, at least 20% by weight low molecular weight compounds.

The percentage content of the binder system is preferably less than 50% by weight and more preferably between 4 and 35% by weight, based on the compound as a whole. The function of the binder system is to keep the structure of the shaped part intact before sintering.

The inorganic powder is preferably a ceramic or metallic powder which makes up at least 50% by weight and preferably more than 65% by weight of the compound.

The polymeric main component of the binder system is preferably a thermoplastically processable partly crystalline line elastomeric polyester.

Corresponding polyesters generally suitable for this purpose are, for example, copolyesters (segmented polyester elastomers) which are made up of a plurality of recurring short-chain ester units and long-chain ester units joined by ester bonds, the short-chain ester units making up 15 to 65% by weight of the copolyester and corresponding to formula I:

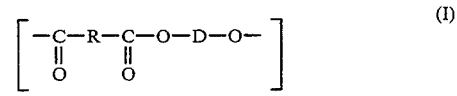

(I)

The long-chain ester units make up 35 to 85% by weight of the copolyester and correspond to formula II:

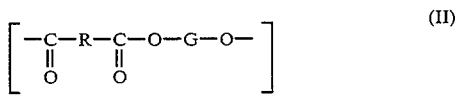

(II)

In formulae I and II,
R is a dibasic residue of a dicarboxylic acid having a molecular weight of <350 g/mol, D is a difunctional residue of an organic diol having a molecular weight of <250 g/mol, G is a difunctional residue of a long-chain glycol which has an average molecular weight of about 350 to 6000 g/mol.

The copolyesters particularly suitable in accordance with the invention can be produced by polymerizing a) one or more dicarboxylic acids, b) one or more linear long-chain glycols and c) one or more low molecular weight diols with one another.

The dicarboxylic acids for the production of the copolyester may be aromatic, aliphatic or cycloaliphatic. Preferred dicarboxylic acids are aromatic $C_{8-16}$ dicarboxylic acids, more particularly phenylene dicarboxylic acids, such as phthalic, terephthalic and isophthalic acid and 2,6-naphthalene dicarboxylic acid.

The low molecular weight diols for the reaction to form the short-chain ester units of the copolyesters belong to the classes of acyclic, alicyclic and aromatic dihydroxy compounds. Preferred diols contain 2 to 15 carbon atoms, such as ethylene, propylene, tetramethylene, isobutylene, pentamethylene, 2,2-dimethyl trimethylene, hexamethylene and decamethylene glycols, dihydroxycyclohexane, cyclohexane dimethanol, resorcinol, hydroquinone and the like. Suitable bisphenols for the present purpose are bis-(p-hydroxy)-diphenyl, bis-(p-hydroxyphenyl)-methane, bis-(p-hydroxyphenyl)-ethane and bis-(p-hydroxyphenyl)-propane.

The long-chain glycols for producing the soft segments of the copolyesters preferably have molecular weights in the range from about 600 to 3000 g/mol and include poly(alkylene ether) glycols in which the alkylene group contains 2 to 9 carbon atoms.

Glycol esters of poly-(alkylene oxide)-dicarboxylic acids may also be used as the long-chain glycol.

Polyester glycols may also be used as the long-chain glycol.

The long-chain glycols also include polyformals obtained by reaction of formaldehyde with glycols. Polythioether glycols are also suitable. Polybutadiene and polyisoprene glycols, copolymers thereof and saturated hydrogenation products of these materials represent satisfactory long-chain polymeric glycols.

Processes for the synthesis of such copolyesters are known from DOS 2 239 271, DOS 2 213 128, DOS 2 449 343 and U.S. Pat. No. 3,023,192.

Copolyesters suitable for the purposes of-the invention are obtainable, for example, under the trade names of Hytrel (Du Pont), Pelpren (Toyobo), Arnitel (Akzo), Ectel (Eastman Kodak) and Riteflex (Hoechst) (see also Thermoplastic Elastomers, ed. by N. R. Legge, G. Holden, H. E. Schroeder, Chapter 8, pages 163–196; Hauser Publishers, Munich 1987).

Accordingly, one preferred embodiment of the molding compounds according to the invention is characterized in that the thermoplastically processable partly crystalline elastomeric polyesters are made up of units of poly(ethylene terephthalate) or poly(butylene terephthalate) or poly(ethylene naphthalate) or poly(cyclohexane-1,4-dimethylene terephthalate) and poly(tetramethylene oxide).

These polyesters known per se are distinguished by the fact that the block-like partly crystalline, thermoplastically processable elastomeric polyesters show high heat resistance by virtue of their high melting temperature (>130° C.) so that other partly crystalline polyesters which are not explicitly mentioned herein may also be used for the purposes of the invention.

The preferred quantity of thermoplastically processable elastomeric polyesters as binder in the binder system is in the range from 40 to 80% by weight and more preferably in the range from 50 to 70% by weight.

According to the invention, elastomeric polyesters have several advantages as binders for ceramic or metallic molding compounds. Thus, elastomeric polyesters undergo defined thermal decomposition reactions in which cyclic ethers, olefins and aromatic carboxylic acids are formed as decomposition products. This defined decomposition reaction leads to controllable degradation products with uniform release of gaseous components so that elastomeric polyester binders can be removed without disturbing the structure of the molding. In the event of uncontrolled decomposition which usually occurs with other binders, the danger of defect structures and weak spots is considerably greater.

Another advantage of elastomeric polyesters as binders in the present invention is that water, which is generally bound in the molding by adsorption to the large surface of the ceramic powders used, can be dissolved in the binder surrounding the ceramic powder by virtue of the far higher water absorption capacity of the elastomeric polyesters by comparison with the polyolefins frequently used.

This fact prevents the critical point at 100° C., which normally occurs where typical binders are used and at which the water evaporating produces defect structures in the molding, from occurring during the heating process.

The presence of at least 20% by weight low molecular weight, vaporizable organic components is essential for a defect-free heating process.

Preferred molding compounds according to the invention are characterized in that the binder system contains at least 20% by weight to 80% by weight low molecular weight compounds (molecular weight <500 g/mol).

It has surprisingly been found that, despite the elastomeric character of the polyester and high plasticizer contents, the green compact is able to develop a heat resistance sufficient for unproblematical heating.

Low molecular weight compounds suitable for the purposes of the invention can contain wetting agents (trialkoxysilanes, polyalkoxysilanes, fatty acids, such as palmitic or stearic acid, polyethylene oxides, etc.), plasticizing aids (waxes, such as fatty acid esters or fatty acid amides, oligomeric polyethylenes, paraffins, plasticizers, such as dialkyl adipate, dibutyl phthalate, butyl benzyl phthalate, N-butyl phenyl sulfonamide, etc.) or other auxiliaries which favorably influence the rheological properties and demolding behavior (pentaerythritol tetrastearate and other fatty acid esters, silicone oils) of the mixtures during processing and are known to the expert in large numbers.

Preferred low molecular weight compounds are low molecular weight esters which show high compatibility with the polyester matrix such as, for example, di-(2-ethylhexyl)-phthalate, phthalic acid dialkyl esters, adipic acid dialkyl esters, fatty acid esters, such as palmitic acid stearate, stearic acid myristate or montanic acid esters, glyoxylic acid diethyl ester and monomeric or oligomeric carbonates, such as bis-(pentadecylphenyl)-carbonate, bis-(nonylphenyl)-carbonate, oligomeric ethylene carbonate or oligomeric propyl carbonate or oligomeric hexanediol carbonate.

Phthalic acid esters and/or adipic acid esters are particularly suitable low molecular weight compounds for the ceramic molding compounds according to the invention. The low molecular weight esters or mixtures thereof advantageously make up from 10 to 50% by weight of the binder system. Other low molecular weight compounds as auxiliaries are generally added to the binder system in quantities of up to 20 parts by weight and preferably in quantities below 10% by weight.

In a particularly preferred embodiment, the low molecular weight compounds according to the invention contain at least three groups capable of reacting with the partly crystalline elastomeric polyester.

Other suitable low molecular weight compounds are esters, alcohols or carboxylic acids which, by virtue of their high functionality (at least three alcohol or carboxylic acid functions), are capable of crosslinking the polyesters by transesterification with the partly crystalline polyesters so that the molding retains its heat resistance during the heating process, even beyond the melting point of the partly crystalline polyester.

Examples of low molecular weight compounds suitable for crosslinking by transesterification are esters based on glycerol, trimethylol propane, pentaerythritol, furanose, glucose and also cellulose or starch or polyvinyl alcohol, such as glycerol tristearate, trimethylol propane tristearate, pentaerythritol tristearate, pentaerythritol tetrastearate, pentaerythritol tetrapalmitate, cellulose triacetate, cellulose acetobutyrate, cellulose propionate.

Other low molecular weight compounds, such as hexamethoxymethylene melamine or hexabutoxymelamine, may also be used as crosslinking agents.

It is also possible to use crosslinking agents based on molecules containing at least three carboxylic acid groups to crosslink the partly crystalline thermoplastic therefrom in free form or as an ester by transesterification, for example citric acid, homopolymers or copolymers of acrylic or methacrylic acid or esters thereof, such as methyl methacrylate or butyl acrylate, or even copolymers with maleic anhydride as a structural element.

In addition to the two components—crucial to the composition of the binder system according to the invention—of at least 20% by weight of a thermoplastically processable partly crystalline elastomeric polyester and at least 20% by weight low molecular weight, vaporizable organic components, the binder system may also contain conventional thermoplastics in quantities of up to at most 60% by weight in addition to the other additives already described. Examples of such thermoplastics are polyacrylates, ethyl cellulose, ABS, hydroxypropyl cellulose, high-density and low-density polyethylene, cellulose acetate, polyamides, polyesters, for example polyethylene terephthalate, polybutylene terephthalate, ethylene/acrylic acid copolymers, cellulose acetobutyrate, polystyrene, polypropylene, polybutylene, polyoxymethylene and polyethylene oxide.

The present invention relates to ceramic or metallic molding compounds suitable for injection molding. The ceramic or metallic powder in the molding compound is selected with regard to the function it is intended to perform in the sintered molding, as well known to the expert.

The inorganic powders are preferably powders from the group of the non-oxides Si, $Si_3N_4$, AlN, BN, SiC, $B_4C$, the transition metal carbides, nitrides, silicides, borides, from the group of the oxides $Al_2O_3$, $ZrO_2$, $SiO_2$, $Y_2O_3$, $La_2O_3$, rare earth oxides, $Cr_2O_3$, $TiO_2$, titanates, ferrites, from the group of the elements B, C, Al, Si, mixtures of these compounds or mixed phases of these compounds or metallic powders.

Typical ceramic powders are, for example, silicon (Si), silicon nitride ($Si_3N_4$), aluminium oxide ($Al_2O_3$), zirconium dioxide (preferably calcium-oxide-stabilized $ZrO_2$), ferrite, silicon carbide (SIC) and mixtures thereof.

The inorganic powder silicon and/or silicon nitride is particularly preferred.

To obtain a sintered ceramic molding having excellent properties, the ceramic powder should preferably be selected or treated in such a way that the powder particles are very closely packed. Important factors for a close packing are, in particular, the particle size distribution and the degree of agglomeration [M. J. Edirisinghe, J. R. G. Evans, Int. J. High Technology Ceramics 2, 1–31 and 249–278 (1986)].

Typical metallic powders are iron and steel powder, aluminium powder and powders of hard metals, for example tantalum, molybdenum, tungsten, etc. Typical particle sizes are in the range from 1 to 50 $\mu$m.

The molding compounds according to the invention may be obtained by mixing the components.

To this end, the inorganic powder may be premixed with the components of the binder system at room temperature. The production of the molding compound is completed by application of shear forces in a kneader and/or extruder at temperatures of 100° to 260° C., depending on the composition of the molding compound. The molding compound may then be left to cool and is subsequently granulated.

Typical screw or plunger injection molding machines may be used for injection molding, the molding compounds being introduced into a mold kept at 40° to 140° C. under pressures of 400 to 1800 bar and at temperatures of 100° to 260° C. Holding pressure is applied to the molding compound until it has solidified by cooling. This typically takes 2 to 60 seconds.

The present invention also relates to a process for the production of the ceramic moldings. The process according to the invention is characterized in that
  a) a molding compound according to the invention is prepared by mixing the components and
  b) subjected to injection molding,
  c) the binder system is removed from the injection molding by heating and
  d) the molding compound is sintered.

The demolded green compacts are then heated in accordance with the invention to remove the binder system, i.e. the polymeric binder and all more or less volatile additives, in steps. This heating step may be carried out in air or in an inert gas atmosphere and/or under reduced pressure (1060 to 0.1 mbar). Although the heating rate and the final temperature are dependent on the type and quantity of the individual components of the binder system and the characteristic (geometry) of the molding, heating rates of 5 to 150 K. per hour may be mentioned as typical. Additional holding stages at 130° to 150° C., 180° to 200° C. and 240° to 260° C. for periods of 2 to 24 hours can be of advantage in this regard. The final temperatures of the heating process should be at least 350° C. and are preferably in the range from 400° to 450° C.

The temperature may then be further increased to the level required for sintering the ceramic powder. The final temperature level naturally varies according to the type of inorganic powder used and the shape of the molding. In general, the temperature may be increased after removal of the binder system by heating at a rate of 50 to 1000 K. per hour until the required final temperature of 1000° to 2000° C. is reached.

For complete sintering of the ceramic powder, the molding is kept at the final temperature reached for 15 minutes to 24 hours. Sintering is generally carried out in an atmosphere of air, oxygen, nitrogen or an inert gas.

The present invention affords many advantages including, in particular, the following:

The invention provides an improved molding compound by using elastomeric polyesters which flow freely and disperse readily in the melt, so that the molding compound remains thermoplastically processable even where it has a high content of ceramic or metallic powder.

In addition, thermoplastically processable partly crystalline elastomeric polyesters in combination with other low molecular weight organic compounds as binder system form highly mixtures which lead to good processability and good heating behavior.

The partly crystalline thermoplastically processable elastomeric polyesters also have a high melting temperature, so that the heating process can be carried out at higher temperatures and hence more quickly and efficiently than in the case of the plasticizing systems normally used. At the same time, the elastomeric properties of the plasticizing system provide for a good diffusion and evaporation ratio of the pore formers.

Surprisingly, dimensional stability remains intact during the heating process although it is generally known that the heat resistance of partly crystalline elastomeric polyesters is lower than that of conventional thermoplastics. This is all the more surprising insofar as the addition of low molecular weight additives reduces heat resistance even further.

The present invention provides an improved process in which the ceramic or metallic powder and the binder system may be effectively mixed, the resulting mixtures are readily processable and moldings produced therefrom can be processed and sintered in much shorter heating times.

The molding compounds according to the invention and the process for the production of moldings therefrom by injection molding and thermal aftertreatment have the advantage that they flow freely and are thus readily thermoplastically processable coupled with distinctly shorter heating times to remove the binder system which ensures that defect-free moldings are obtained.

The following Examples are intended to illustrate the invention without limiting it in any way.

EXAMPLE 1

324 g poly(butanediol-terephthalate-co-poly(tetramethylene oxide)) having a Shore D hardness of 63 (Hytrel 6356), 102 g dibutyl phthalate, 102 g dioctyl adipate and 11 g pentaerythritol tetrastearate are mixed with 1460 g of an Si powder having an average particle size of 2 μm and processed in a laboratory kneader to form powder-form granules. The granules thus obtained were injection-molded at a melt temperature of 240° C. to form disks 4 mm thick and 60 mm in diameter.

The disks were heated to 200° C. at a constant rate of 80 K./h, then 250° C. at a rate of 40 K./h and, lastly, to the final temperature of 450° C. at a rate of 80 K./h. The weight loss after heating for 1 hour at the final temperature of 450° C. was more than 26.5% by weight, corresponding to almost complete removal of the binder system.

The green compacts thus heated showed neither bubbles nor cracks nor any other discernible defects. In a following sintering and nitriding step, defect-free $Si_3N_4$ moldings were obtained as ceramic end products from these defect-free test specimens.

EXAMPLE 2

324 g of a poly(butanediol-terephthalate-co-poly(tetramethylene oxide)) having a Shore D hardness of 40 (Hytrel 4056) were used instead of the polyester used in Example 1. A defect-free ceramic end product was obtained after treatment in otherwise the same way.

EXAMPLE 3

378 g poly(butanediol-terephthalate-co-poly(tetramethylene oxide)) having a Shore D hardness of 40 (Hytrel 4056), 75 g dibutyl phthalate, 75 g dioctyl adipate and 11 g pentaerythritol tetrastearate are processed with 1460 g Si powder in the same way as described in Example 1. Defect-free ceramic end products were obtained after molding, heating and sintering.

EXAMPLE 4

110 g polybutanediol terephthalate-co-poly(tetramethylene oxide) having a Shore D hardness of 63 (Hytrel 6356), 64 g dibutyl phthalate, 64 g dioctyl adipate, 4.9 g pentaerythritol tetrastearate and 657 g Si powder are processed to powder-form granules as described in Example 1. The granules were injection-molded at 240° C. to form small bars measuring 80×10×4 mm.

Heating was carried out with the same temperature program as in Example 1, the small bars being mounted at two points separated by a distance of 70 mm. After heating, the weight loss of the bars was more than 26.5% by weight. The bars showed no distortion, cracks or bubbles. In a following sintering and nitriding step, defect-free $Si_3N_4$ moldings were obtained as ceramic end products from these defect-free test specimens.

Comparison Example 529 g poly(butylene terephthalate-co-poly(tetramethylene oxide)) having a Shore D hardness of 40 (Hytrel 4056), 11 g pentaerythritol tetrastearate and 1460 g Si powder were mixed as in Example 1, injection-molded to disks and heated.

The heated green compacts were deformed and had bubble-like surface structures.

What is claimed is:

1. A molding compound for the production of inorganic sintered moldings comprising:
   a) silicon powder, silicon nitride powder, or a mixture thereof; and
   b) a binder system consisting essentially of 20 to 80% by weight of a thermoplastically-processable, partly crystalline elastomeric polyester having a melt temperature of >130° C. and 20 to 80% by weight of volatile organic low molecular weight compounds having a molecular weight of less than 500 g/mol, the low molecular weight compounds being selected from the group consisting of di-(2-ethylhexyl)-phthalate, phthalic acid dialkyl esters, adipic acid dialkyl esters, fatty acid esters, glyoxolic acid diethyl ester, and monomeric or oligomeric carbonates, and the binder system further containing a polyfunctional compound capable of crosslinking the polyester by transesterification, the polyfunctional compound consisting of an ester based on glycerol, trimethylol propane, pentaerythritol, furanose, glucose, cellulose, starch, or polyvinyl alcohol.

* * * * *